(12) United States Patent
Belozerco

(10) Patent No.: US 11,899,737 B1
(45) Date of Patent: Feb. 13, 2024

(54) SYSTEM AND METHOD FOR MANAGING INFORMATION SOURCED BY A PRIMARY SERVER THAT IS SENT TO OTHER SERVERS WHEN A USER INTERACTS WITH A WEB PAGE WITHOUT DISTORTING THE OTHER SERVERS

(71) Applicant: Charles Schwab & Co., Inc, San Francisco, CA (US)

(72) Inventor: Deem Luis Belozerco, Austin, TX (US)

(73) Assignee: Charles Schwab & Co., Inc., San Francisco, CA (US)

( * ) Notice: Subject to any disclaimer, the term of this patent is extended or adjusted under 35 U.S.C. 154(b) by 0 days.

(21) Appl. No.: 17/235,732

(22) Filed: Apr. 20, 2021

Related U.S. Application Data

(60) Provisional application No. 63/012,265, filed on Apr. 20, 2020.

(51) Int. Cl.
*G06F 16/958* (2019.01)
*G06F 16/955* (2019.01)
*G06F 16/9535* (2019.01)
*G06F 16/957* (2019.01)

(52) U.S. Cl.
CPC .......... *G06F 16/972* (2019.01); *G06F 16/955* (2019.01); *G06F 16/957* (2019.01); *G06F 16/9535* (2019.01)

(58) Field of Classification Search
CPC .... G06F 16/972; G06F 16/955; G06F 16/957; G06F 16/9535
See application file for complete search history.

(56) References Cited

U.S. PATENT DOCUMENTS

| | | | | |
|---|---|---|---|---|
| 2002/0099852 | A1* | 7/2002 | Fischer | G06F 16/9577 709/218 |
| 2004/0003071 | A1* | 1/2004 | Mathew | H04L 63/0227 707/E17.109 |
| 2007/0162975 | A1* | 7/2007 | Overton | G06F 21/561 726/24 |
| 2007/0208751 | A1* | 9/2007 | Cowan | G06Q 30/02 |
| 2011/0307867 | A1* | 12/2011 | Murthy | G06F 11/3684 717/125 |
| 2016/0125299 | A1* | 5/2016 | Lee | G06N 20/00 706/12 |

OTHER PUBLICATIONS

CloudHQ, "Free Email Tracking Blocker", https://web.archive.org/web/20190411223724/https://www.email-tracking-blocker.com/features (Year: 2019).*

* cited by examiner

*Primary Examiner* — Mark D Featherstone
*Assistant Examiner* — Brooks T Hale
(74) *Attorney, Agent, or Firm* — Harness, Dickey & Pierce, P.L.C.

(57) ABSTRACT

A system and method builds functions into a web page sourced by a primary server and that would otherwise report to a set of one or more other servers actions performed by users of the web page when they interact with its elements so that the interactions instead report to the user of the web page. The system and method then causes the browser to simulate such interactions with all such web page elements, thereby causing the functions to report the information that would have been sent to the other server, and an identifier of the other server.

18 Claims, 3 Drawing Sheets

SYSTEM AND METHOD FOR MANAGING INFORMATION SOURCED BY A PRIMARY SERVER THAT IS SENT TO OTHER SERVERS WHEN A USER INTERACTS WITH A WEB PAGE WITHOUT DISTORTING THE OTHER SERVERS

RELATED APPLICATION

This application claims the benefit of U.S. Provisional Patent Application Ser. No. 63/012,265 entitled, "Method and Apparatus for Managing Information Sourced by a Primary Server That Is Sent To Other Servers When a User Interacts With a Web Page" filed on Apr. 20, 2020 by Diego Belozerco, having the same assignee as the present application and is hereby incorporated by reference in its entirety.

FIELD OF THE INVENTION

The present invention is related to computer software and hardware and more specifically to computer software and hardware for managing information sourced by a primary server that is sent to a set of one or more other servers when a user interacts with a web page provided by the primary server.

BACKGROUND OF THE INVENTION

Web pages can be programmed to report parameters to a server when a user hovers over, or clicks, a link or other element of the page. The server to which the report is made, and the parameters, are programmed into the code for the web page, but the manner in which it is programmed may not be suitable for easy maintenance of that information, even by someone who can understand the code. People who don't understand the code struggle to even identify which server and parameters correspond to each element, as there can be one or more levels of indirection that actually generate the report to the server. However, automated tools that could be developed to display such information could trigger a false detection of a hover or a click, causing a technical problem of a distorted number of clicks or hovers being reported, merely by maintaining the code using such automated tools. What is needed is a system and method that can assist users in identifying parameters and servers associated with different elements on a web page that does not distort the number the number of clicks or hovers each time the system or method is used.

SUMMARY OF INVENTION

A system and method uses a particular arrangement of multiple servers, and browser on a system administrator computer system to provide reporting functions the computer is otherwise unable to perform. The web page is downloaded from a primary server into the system administrator's browser and the system and method scans the source code of that web page on the system administrator computer system for functions that report parameters to any of several other servers, and replaces them with functions that generate a report of which server would have been sent the parameters, and the parameters that would have been sent (referred to as a local reporting function). The function names of the replaced functions may remain the same, or new functions with different names can be added, and the references to the functions on the page may be changed to reflect the new names. The scan for the functions may be made on the basis of the function name matching a provided list of function names that are reserved or otherwise used for this purpose, or the functions themselves may be checked to determine whether they report to a set of other servers on a list.

The operability of the web page elements that can use such functions to operate, is then partly disabled so that they can be operated by clicking on them, without the element performing the page loading function for which it is designed. For example, the linked page of a link may be removed so that a click on that link will not cause the browser to load the linked web page, in place of the page being processed as described.

The page with the replaced functions is either modified as described above and herein in the system administrator's browser, or modified as described above and herein outside of it and loaded into the system administrator's browser, the document object model for the page is retrieved from the browser, and some or all of the types of elements are filtered from being further analyzed. The filtered types of elements may be those that don't involve a link, and/or those that don't typically generate any type of report to a server when hovered over or clicked. Other types of elements may be ignored based on user selections to only report for certain types of document model elements.

Of the remaining elements, the first element is selected, the name of the selected element is added to the report, a reference to the fact that a hover is or was performed may be added to the report, and the browser is instructed to perform a hover function over the selected element. The hover of the selected element causes operation of its associated local reporting function. The operation of the either changed or newly added function will then add to the report the URL of the server to which the hover would have reported, had its function not been changed (or a pseudonym for the URL of the server), optionally the original name of the function, and the parameter or parameters that would have been sent to the server. The process may be alternately, or additionally performed for a click of the element (with the reference to the hover on the report replaced with a reference to a click and the browser being instructed to perform a click of the element instead of a hover), and then the next of the remaining elements is selected and the process above is repeated until all of the remaining elements have been processed in this manner. The hovers or clicks will not generate the report to the server because they have been replaced with a local reporting function, preventing information about hovers or clicks from being transmitted to the server and thereby preserving the statistics recorded by the server to those performed by actual users, and not those hovers or clicks being performed by the present invention.

In one embodiment, the reported information is also, or instead, added to the web page display near the element and the browser is instructed to display the information (either via a reload of the page or by adding the information in such a way that javascript code added to the web page can display it) so that the user can see some or all of the information from the report displayed on the web page near the element to which such information corresponds.

In one embodiment, the system and method can compare the information reported with information reported at a prior time, and highlight changes.

The page is loaded from the primary server into a different user's browser, and operates as originally intended, by sending information to one or more other servers based on the user's interactions with the page. Any number of such different users may use the page in this fashion, either before or after the system administrator generates reports.

DETAILED DESCRIPTION OF A PREFERRED EMBODIMENT

Figure 1:
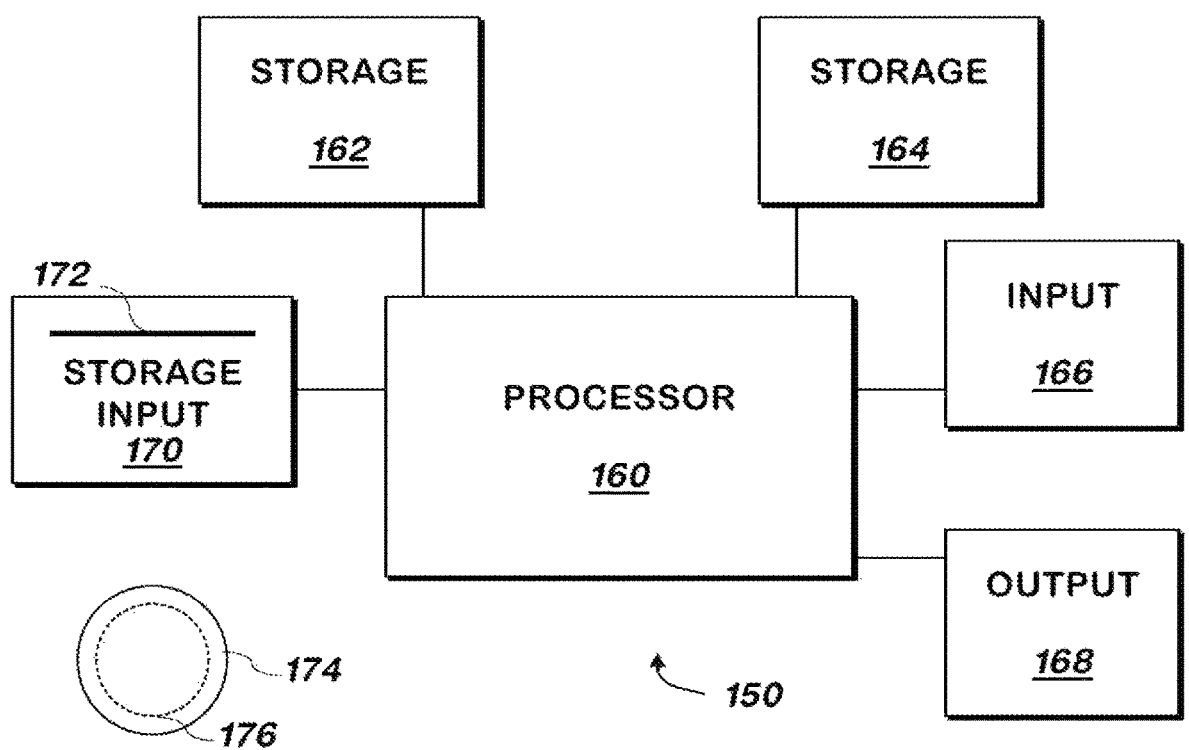
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. The components of the system described herein may be implemented via one or more hardware computer processors that operate under firmware or hardware control as described herein.

Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional ORACLE SPARC T SERIES SERVER running the ORACLE SOLARIS operating system commercially available from ORACLE CORPORATION of Redwood Shores, California, a PENTIUM-compatible personal computer system such as are available from DELL COMPUTER CORPORATION of Round Rock, Texas running a version of the WINDOWS operating system (such as WINDOWS commercially available from MICROSOFT Corporation of Redmond Washington or a Macintosh computer system running the MACOS (such as Mojave) or OPENSTEP operating system commercially available from APPLE INCORPORATED of Cupertino, California and the FIREFOX browser commercially available from MOZILLA FOUNDATION of Mountain View, California or INTERNET EXPLORER browser commercially available from MICROSOFT above, although other systems may be used. Each computer system 150 may be a SAMSUNG GALAXY S10 commercially available from SAMSUNG ELECTRONICS GLOBAL of Seoul, South Korea running the ANDROID operating system commercially available from GOOGLE, INC. of Mountain View, California. Various computer systems may be employed, with the various computer systems communicating with one another via the Internet, a conventional cellular telephone network, an Ethernet network, or all of these.

Figure 2:
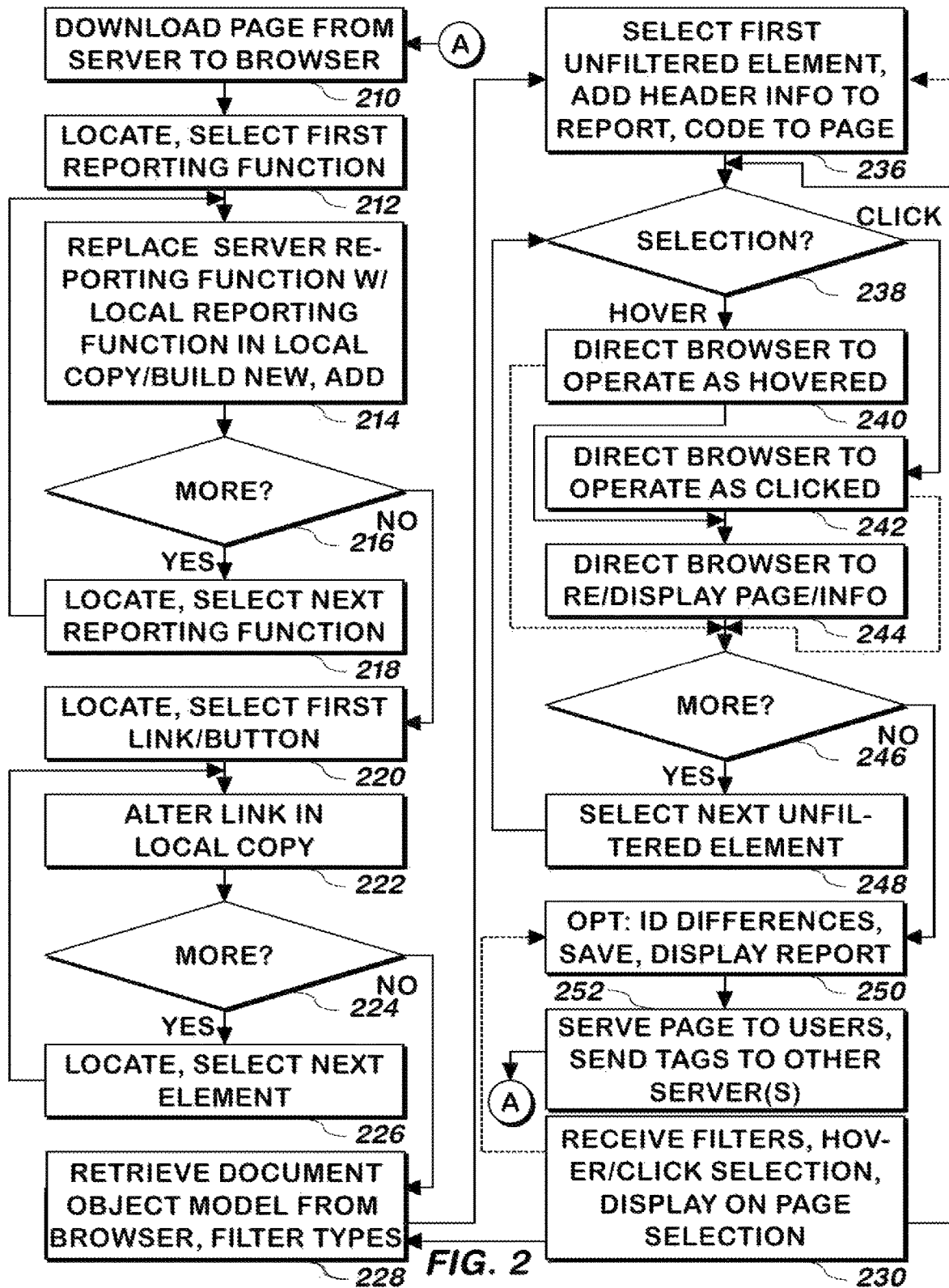
FIG. 2 is a flowchart illustrating a method of displaying information sourced by a primary server that is sent to one or more other servers when a user interacts with a web page downloaded from the primary server to the user's computer system without generating reporting function operations according to one embodiment of the present invention.

Referring now to FIG. 2, a method of managing information that can be provided to an other server in a set of other servers when a user performs an action on a web page provided by a primary server is shown according to one embodiment of the present invention. In one embodiment, the providing of the information to the other servers is suppressed by the present invention, but such information is ordinarily provided to one or more of those other servers when used by a user who is interacting with the web page and not performing the method or running the system described herein.

A web page is downloaded 210 by a browser of a system administrator's computer from a primary server, including one or more computer systems on which the web page is stored for serving to users on the world wide web. The primary server may include one or more conventional server computer systems that are separate from the system administrator's computer system. The web page that is downloaded,=references one or more other servers different from the foregoing two computer systems.

The system administrator can operate software that may be a plug in to the browser or a separate software program that operates as will now be described. The software may also be implemented by dedicated logic circuitry that operates as described.

The functions that are built into the web page that was downloaded, and that report certain actions to the other servers that any user of the web page performs are either replaced by alternate functions of the same name on the web page source, or the references to those functions on the web page are replaced to reference alternate functions which are added to the web page source using conventional techniques. In one embodiment, the web page may be altered as it arrives into the browser, changed within the browser, or copied, changed, and stored on the administrator's computer system and the browser is redirected to it, which causes the browser to load it as a web page.

To change or add the functions, the first reporting function is located and selected 212. To locate a reporting function, in one embodiment, the name of the function is compared to reporting function names stored on a list, and if the name of the function matches one of the names on the list, it is considered to be a reporting function, and otherwise it is not and that function is skipped and an attempt is made to match the name of the next function with one of the names on the list and the process is repeated until a match is found.

In another embodiment, a list of the URLs of the other servers used to implement the reporting function when a regular user (who is not a system administrator) performs actions on the web page, are compared to any server referenced in the function to determine whether the function is a reporting function. If the function references one of those servers, it is considered to be a reporting function and otherwise, it is not, and the search continues until one such function that references one or more such URLs is found.

In one embodiment, the other server reporting capability in the function is replaced 214 with a local reporting function on the local copy of the web page on the system administrator's computer system. If there are more other server reporting functions 216 the next one is located and selected as described above and the method repeats at step 214 using the newly selected reporting function. If there are no more reporting functions 216, the method continues at step 220.

In another embodiment, instead of replacing a portion or all of the other server reporting functions in step 214 a new reporting function is added to the local copy of the web page with the new function performing the local reporting function, and the names of the existing and new reporting functions are added to a table that will be used to change the references from the function that existed on the web page when it was downloaded, to the corresponding new one. The local reporting function adds information that would otherwise have been reported to one of the other server systems, to a list report and/or displays it on the display screen of the system administrator's computer system.

At step 220, the links to other web pages are removed from all of the elements on the web page that would cause the browser to load a new page if the element was operated, for example, by clicking it. In one embodiment, this involves blanking out the reference to the other page, changing it to refer to the web page itself or any other method of preventing the link from causing the browser to load a different page than the web page being altered. To do so, the first link or button or other similar element is located on the page at step 220 and the link is altered 222 to make it inoperable to load a different page in the local copy of the web page stored in the system administrator's computer system. In the event that the original reporting functions were renamed, the table of existing and new function names built as described above is used to modify the reference to the existing function to the corresponding new function. If there are more such elements on the local copy 224, the next such element is selected 226 and the method continues at step 222 using the newly selected element. Otherwise 224, the method continues at step 228.

At step 228, the document object model of the downloaded web page, as altered, is retrieved from the browser, and one or more types of elements of the document object model are filtered (i.e. removed from a copy of the document object model based on their type) from the retrieved results. Filtering an element means not processing it as described herein, but otherwise leaving it on the web page in the browser. In one embodiment, the filtered elements include any type of element that cannot be clicked on or hovered over, and/or anything that, when clicked on or hovered over does not activate a function on one of the two types of lists described above.

Additionally, the system administrator can specify other one or more types of elements to be filtered in step 230 and such other elements having those one or more types are also filtered from the document object model when building the copy of the document object model to use as described below and herein. The method continues at step 236.

At step 236, header information is added to a list report which may be stored in memory or on a separate file and the first unfiltered document object model element (e.g. from the copy) is selected. In one embodiment, the system administrator can select either hovers or clicks for the report as part of step 230, and if the selection was for hovers 238, the method continues at step 240, and if the selection was for clicks 238, the method continues at step 242. In still another embodiment, both types of actions are taken if the system administrator so specifies, in which case step 240 follows step 236 and step 242 follows step 240.

At step 240, the browser is instructed to operate the selected document object model element as if it were hovered over by the system administrator moving the mouse cursor over the element corresponding to the selected unfiltered document model object and holding it there. In response, the modified or new function associated with the hover action is performed, which causes the function to add the tag that would have been provided to the other server by the function existing when it was downloaded, and optionally the original function name, the URL of the other server or both, to the list report. The tag is one or more codes, unique to other actions of the same or other web pages, that the other server will interpret as evidence of the action of the element by any user of the downloaded web page. In one embodiment, a label for the action "hover" is added to the report as part of step 240 to identify the information as corresponding to the hover, though if one action or the other (hover or click) is selected in step 230 and either step 240 or 242 is performed but not both, a label for the action ('hover' or 'click') can be added to the report header as part of step 236.

At step 242, the browser is instructed to operate the selected document object model element as if it were clicked on by the system administrator. In response, the modified or new function associated with the click action of such element is performed, which adds the tag that would have been identified to the other server if such element had been clicked by a user of the web page as originally served, and optionally the URL of the other server, to the list report. In one embodiment, the action "click" is added to the report as part of step 240 to identify the information as corresponding to the click.

If both actions are performed, step 242 follows step 240 and step 244 or 246 follows step 242. If only one action is performed, step 244 or 246 follows steps 240 or step 242, whichever step is performed.

Steps 212 and/or 240 and/or 242 and/or 236 may include modifying the web page so that the new or modified function, when executed, can cause a pop up display of the tag and optionally, the server URL and/or the existing (i.e. original) function name, near the selected document object model element. This capability may be provided by the new or modified function in addition to, or instead of, the addition of the tag and other information to the list report that is also performed by the new or modified function, for example, under control of the system administrator via a selection received at step 230. In one embodiment, a conventional pop up DIV technique is used to cause this information to be displayed. An identifier or location of the selected document object model element is retrieved from the document object model or the web page and passed to the function to allow the pop up display to be located near the selected document object model element. A pop up div is explained on the web page at web.cortland.edu/flteach/mm-course/glossPopupDiv.html.

In step 244, the browser is directed to display such information if such display does not occur by operation of the function, for example via javascript code deposited on the page at step 236. The browser may be instructed to redisplay some or all of the page to implement this display. The method continues at step 246.

At step 246, if there are more unfiltered document model elements not already selected, the next such unfiltered element is selected 248, and the method continues at step 238, using the newly selected unfiltered element, and otherwise 236, the method continues at step 250. At step 250, the list report is displayed to the user, by providing it to a printer or display screen. In one embodiment, the list report contains a list of all of the document object model element names and/or types, and the tags and server to which the tag is reported for each unfiltered document object model element, along with any other optional information added to it as described above. In one embodiment, step 250 includes comparing such report with a prior saved report for that web page to identify differences and displaying the list report with the differences highlighted, for example using underlining to identify elements that have been changed and optionally incorporating information from the prior report in strikethrough text to show the former information for that element. In one embodiment, the list report is displayed to the user if the display on page selection is not selected in step 230. The list report may be saved on the system administrator's computer system named with the full URL of the web page as part of step 250 for subsequent comparison with a later version of the web page at the same URL.

The same page is downloaded from the same primary server (which may physically be made up of several servers) by a different computer system of a user who is other than the system administrator, and as the user performs actions on the page, no list report or on screen report of all tags is provided to the user and the tags are sent to one of the several other servers for each action (a click or hover of an element) performed. The tag (which may be a code or several pieces of information) may be sent to different ones of the other servers as the user performs actions on different elements of the page or performs different actions on the same element of the page. Step 252 may be performed before step 210 or after step 250.

System.

Figure 3:
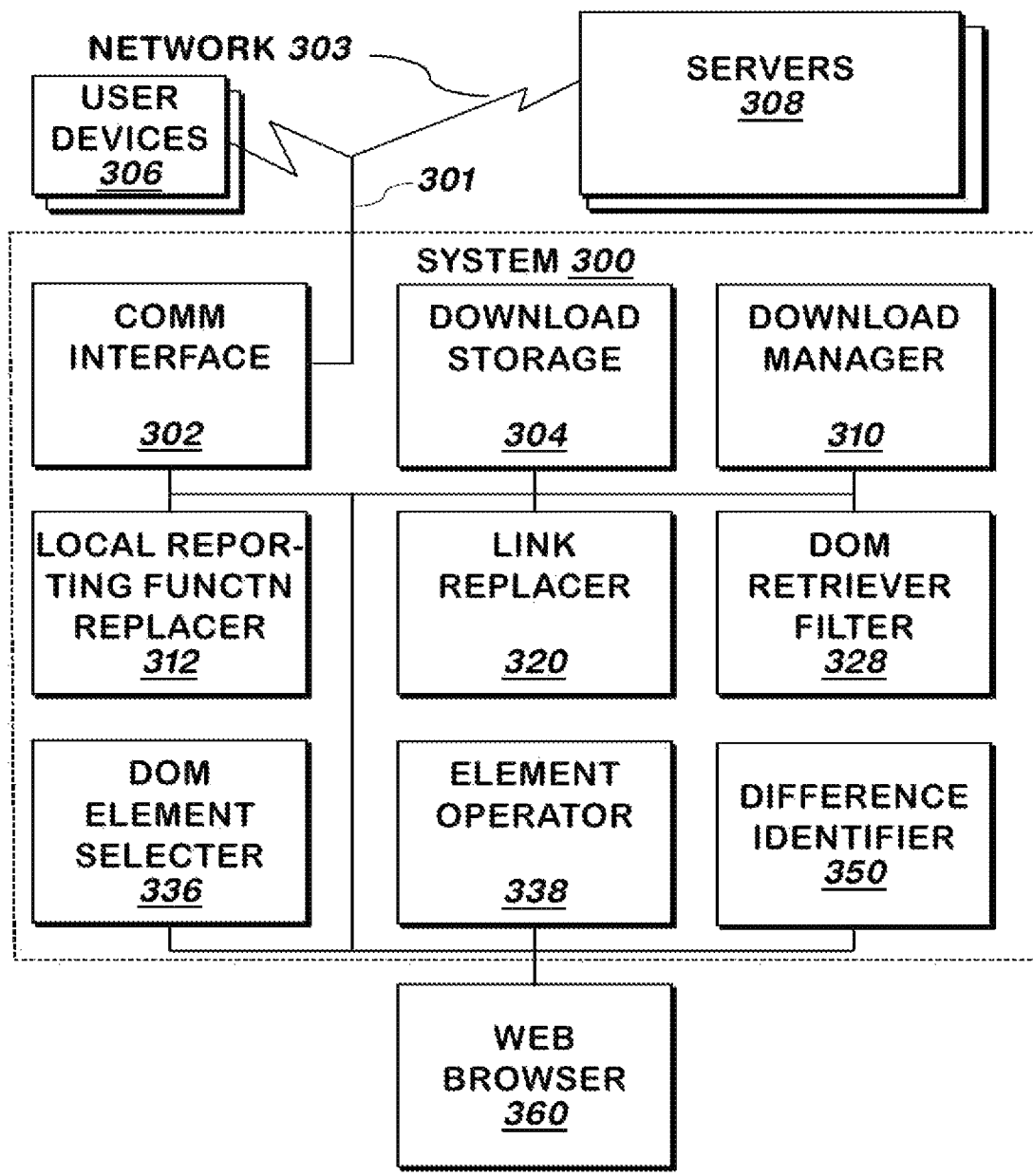
FIG. 3 is a block schematic diagram of a system for displaying information sourced by a primary server that is sent to one or more other servers when a user interacts with a web page downloaded from the primary server to the user's computer system without generating additional reporting function operations according to one embodiment of the present invention.

A system may be used to perform the method described above, containing elements that perform the various functions above. Referring now to FIG. 3, a system 300 for analyzing web pages without generating additional server reporting operations is shown according to one embodiment of the present invention. Communication Interface 302 includes a conventional TCP/IP-compatible communication interface running suitable communications protocols such as Ethernet, TCP/IP, or both. Communication interface 302 includes input/output 301 coupled to a network 303 such as an Ethernet network, the networks that make up the Internet, or both. Network 303 is coupled to one or more server computer systems 308, and one or more user devices 306 which may include conventional computer systems, such as desktop systems, laptop systems, tablets or mobile phones, and the like. System 300 may include a conventional computer system, for example of an administrator. Servers 308 include conventional web servers, as well as tag management servers which record tags that are sent when a user hovers over, or clicks, a link or button from any number of user devices 306 and generates a report from such information that describes how many users performed such a click or hover and other information about the user, while such users are using user devices 306 in the normal course of web browsing and operation.

Download manager 310 downloads from one or more servers 308 into download storage 304 the web page from the server or servers 308 to allow web browser 360 to operate the web page as described herein and above. Download storage 304 may include conventional storage, such as disk or memory storage.

Download manager 310 signals local reporting function replacer 312, which locates and selects the first reporting function in the web page stored in download storage 304 as described above and replaces such server reporting function with a local reporting function in the webpage, or in a single new copy of the webpage it makes and stores in download storage 304, and processing continues using the single new copy though other numbers of copies may be used. Local reporting function replacer 312 attempts to locate and select another reporting function as described above, and if successful, repeats the process described above (using the downloaded or single new copy of the web page) until all server reporting functions have been replaced by a local reporting function as described above. When local reporting function replacer 312 has completed such replacements, local reporting function replacer signals link replacer 320, optionally with an identifier of the downloaded and modified or the newly-built single copy it modified as described herein.

When signaled, link replacer 320 locates and selects the first link or button in such webpage, alters the link from the link or button as described above in the modified web page or modified copy identified to link reporter by local reporting function replacer 312, and stored in download storage 304. Link replacer 320 locates and selects each link or button on the webpage and repeats the process described herein until all such links and buttons have been altered as described above, at which point link replacer 320 signals DOM retriever filter 328, optionally with an identifier of the web page or copy of the web page, altered as described herein. If the single copy of the web page was modified, link replacer 320 causes the single copy, modified as described herein, to be loaded into web browser 360.

When signaled, DOM retriever filter 328 retrieves from web browser 360 the document object model for the web page having the identifier it receives or using a default identifier, and filters, or causes web browser 360 to filter, the types as described above. DOM retriever filter 328 receives from a user designations of types of objects to filter, and whether to test hover, clicks, or both, and may display some or all of such information received from the user on the webpage as described above. When DOM retriever filter 328 has finished filtering the types as described herein, it signals DOM element selector 336 with the users choice of hover and/or click selection.

When it receives the signal, DOM element selector 336 selects the first unfiltered element adds header information to the report that the system will generate as described herein and provides an identifier of the selected element and the user selection of hover and or click to element operator 338. When it receives such information, element operator 338 directs web browser 360 to operate as hovered over, or clicked on, the element whose identifier it received, and optionally directs web browser 360 to redisplay the page and information as described herein. If both hover and click are selected by the user, each such operation may be performed sequentially, optionally with web browser 360 being directed to display or redisplay the page and information in between such operations. As element operator 338 directs web browser 360 to operate the element whose identifier is received by element operator 338 as hovered or clicked, the local reporting function will store additional reporting information in the report, optionally via DOM element selector 336.

Element operator 338 then signals DOM element selector 336, which selects the next unfiltered element and repeats the process until all such unfiltered elements have been processed as described herein. DOM element selector 336 signals difference identifier 350 which optionally identifies the differences as described above, and saves and displays the report to a user to use for analysis or maintenance of the originally downloaded web page on server 308.

A copy of the page downloaded to web browser 360 by download manager 310 is downloaded by users to user devices 306, which may include conventional computer systems or smart devices, each running a web browser similar or identical to web browser 360 in the conventional fashion, and the functions built into such page send tags to one or more servers 308, optionally different from the server or servers 308 from which the page was downloaded.

Each system element may include a conventional hardware processor or hardware processor system or processor system or processor that is coupled to a hardware memory or hardware memory system or memory or memory system, each of these being conventional in nature. The processor is specially programmed to operate as described herein. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa. System elements are coupled to one another to perform the functions described herein and may utilize data obtained in any possible manner.

Certain Embodiments

Described is a method of identifying reporting information that is automatically generated by a user's browser to at least one server that records and reports such reporting information based on at least one user action performed on a downloaded web page, without causing such reporting information to be generated, including:

downloading the web page from the server;

for each of at least one original function on the web page that provides the reporting information to at least one of the at least one server based on the user actions, replacing said function with a different function that, based on the user actions performed on the downloaded web page, reports to a computer system other than the at least one server to which the reporting information would be generated by said function based on the user actions performed on the downloaded web page, information about the at least one original function replaced, said information including at least one selected from a group including an identifier of the at least one of the at least one server, and the reporting information that would have been provided by said original function so as to disallow the original function from providing the reporting information to the at least one server;

simulating a performance of two or more user actions with the web page that would have caused at least one of the at least one original function replaced to provide the reporting information;

collecting the information about the original function replaced reported in response to the two or more user actions; and displaying the collected information.

The method may contain additional features whereby at least one of the two or more user actions includes a hover above an element on the web page.

The method may contain additional features whereby at least one of the two or more user actions includes a click on an element on the web page.

The method may additionally include filtering at least one type of element on the web page before the simulating the performance step.

The method may contain additional features whereby the at least one type of element is received from an administrator.

The method may contain additional features whereby the at least one selected from the group includes the identifier of at least one of the at least one server.

The method may contain additional features whereby the at least one selected from the group includes the reporting information that would have been provided by the original reporting function.

The method may additionally include replacing at least one of the links on the web page.

Described is a system for identifying reporting information that is automatically generated by a user's browser to at least one server that records and reports such reporting information based on at least one user action performed on a downloaded web page, without causing such reporting information to be generated, including:

a download manager downloading the web page from the server via an input/output and for providing at least a portion of the downloaded web page at an output;

a local reporting function replacer having an input coupled to the download manager output for receiving the at least the portion of the web page, the local reporting function for, for each of at least one original function on the portion of the web page that provides the reporting information to at least one of the at least one server based on the user actions, replacing in the at least the portion of the web page said function with a different function that, based on the user actions performed on the downloaded web page, reports to a computer system other than the at least one server to which the reporting information would be generated by said function based on the user actions performed on the downloaded web page, information about the at least one original function replaced, said information including at least one selected from a group including an identifier of the at least one of the at least one server, and the reporting information that would have been provided by said original function so as to disallow the original function from providing the reporting information to the at least one server, and for providing at an output the at least the portion of the web page with said replaced at least one function;

an element operator having an input coupled to the local reporting function replacer output for receiving the at least the portion of the web page, the element operator for simulating via an output coupled to a browser a performance of two or more user actions, on the at least the portion of the web page received at the element operator input, that would have caused at least one of the at least one original function replaced to provide the reporting information, so as to cause the browser to provide at an output the information about the original function replaced;

a difference identifier having an input coupled to the browser output for collecting the information about the original function replaced reported in response to the two or more user actions; and for providing at an output for display, at least some of the collected information.

The system may contain additional features whereby at least one of the two or more user actions includes a hover above an element on the web page.

may contain additional features whereby The system may contain additional features whereby at least one of the two or more user actions includes a click on an element on the web page.

The system may additionally include a DOM retriever filter having an input coupled to the download manager output, the DOM retriever filter for filtering at least one type of element on the web page and providing at an output coupled to the element operator at least the portion of the web page filtered.

The system may contain additional features whereby the at least one type of element is received from an administrator.

The system may contain additional features whereby the at least one selected from the group includes the identifier of at least one of the at least one server.

The system may contain additional features whereby the at least one selected from the group includes the reporting information that would have been provided by the original reporting function.

The system may additionally include a link replacer having an input coupled to the download manager, the link replacer for replacing at least one of the links on at least the portion of the web page.

Described is a computer program product computer program product including a nontransitory computer useable medium having computer readable program code embodied therein for identifying reporting information that is automatically generated by a user's browser to at least one server that records and reports such reporting information based on at least one user action performed on a downloaded web page, without causing such reporting information to be generated, the computer program product including computer readable program code devices configured to cause a computer system to:

download the web page from the server;

for each of at least one original function on the web page that provides the reporting information to at least one of the at least one server based on the user actions, replace said function with a different function that, based on the user actions performed on the downloaded web page, reports to a computer system other than the at least one server to which the reporting information would be generated by said function based on the user actions performed on the downloaded web page, information about the at least one original function replaced, said information including at least one selected from a group including an identifier of the at least one of the at least one server, and the reporting information that would have been provided by said original function so as to disallow the original function from providing the reporting information to the at least one server;

simulate a performance of two or more user actions with the web page that would have caused at least one of the at least one original function replaced to provide the reporting information;

collect the information about the original function replaced reported in response to the two or more user actions; and display the collected information.

The computer program product may contain additional features whereby at least one of the two or more user actions includes a hover above an element on the web page.

The computer program product may contain additional features whereby at least one of the two or more user actions includes a click on an element on the web page.

The computer program product may additionally include computer readable program code devices configured to cause the computer system to filter at least one type of element on the web page before the simulating the performance step.

The computer program product may contain additional features whereby the at least one type of element is received from an administrator.

The computer program product may contain additional features whereby the at least one selected from the group includes the identifier of at least one of the at least one server.

The computer program product may contain additional features whereby the at least one selected from the group includes the reporting information that would have been provided by the original reporting function.

The computer program product may additionally include computer readable program code devices configured to cause the computer system to replace at least one of the links on the web page.

What is claimed is:

1. A method of identifying reporting information that is automatically generated by a user's browser for at least one server that records and reports such reporting information based on at least one user action performed on a downloaded web page, without causing such reporting information to be generated, the method comprising:

downloading the web page from a download server, the downloaded web page including a plurality of elements;

for an original function associated with an element of the plurality of elements on the web page that provides the reporting information to the at least one server based on a first user action, replacing the original function with a different function that, based on a second user action performed on the downloaded web page, reports to a computer system other than the at least one server to which the reporting information would be generated by the original function, information about the replaced original function, the information comprising an identifier of the at least one server, and the reporting information that would have been provided by the original function so as to disallow the original function from providing the reporting information to the at least one server;

altering, via a link replacer, a link associated with the element on the web page to disable an operability of the element;

simulating a performance of at least one user action with the element on the web page that would have caused the replaced original function to provide the reporting information to the at least one server;

collecting the information about the replaced original function that is reported in response to the simulated user actions; and displaying the collected reporting information.

2. The method of claim 1, wherein the user action comprises a hover above the element on the web page.

3. The method of claim 1, wherein the user action comprises a click on the element on the web page.

4. The method of claim 1, additionally comprising filtering at least one type of element on the web page before the simulating the performance step.

5. The method of claim 4 wherein the at least one type of element is received from an administrator.

6. The method of claim 1, wherein altering the link associated with the element includes replacing the link on the web page.

7. A system for identifying reporting information that is automatically generated by a user's browser for at least one server that records and reports such reporting information based on at least one user action performed on a downloaded web page, without causing such reporting information to be generated, the system comprising:

a download manager configured to download the web page from a download server, the downloaded web page including a plurality of elements;

a local reporting function replacer configured to, for an original function associated with an element of the plurality of elements on the web page that provides the reporting information to the at least one server based on a first user action, replace the original function with a different function that, based on a second user action performed on the downloaded web page, reports to a computer system other than the at least one server to which the reporting information would be generated by the original function, information about the replaced original function, the information comprising an identifier of the at least one server, and the reporting information that would have been provided by the original function so as to disallow the original function from providing the reporting information to the at least one server;

a link replacer configured to alter a link associated with the element on the web page to disable an operability of the element;

an element operator configured to simulate a performance of at least one user action with the element on the web page that would have caused the replaced original function to provide the reporting information to the at least one server; and a difference identifier configured to collect collecting the information about the replaced original function that is reported in response to the simulated user actions and display at least some of the collected reporting information.

8. The system of claim 7, wherein the user action comprises a hover above the element on the web page.

9. The system of claim 7, wherein the user action comprises a click on the element on the web page.

10. The system of claim 7, additionally comprising a DOM retriever filter configured to filter at least one type of element on the web page and provide to the element operator the filtered web page.

11. The system of claim 10 wherein the at least one type of element is received from an administrator.

12. The system of claim 7, wherein the link replacer is configured to replace the link on the web page.

13. A nontransitory computer useable medium having computer readable instructions for identifying reporting information that is automatically generated by a user's browser for at least one server that records and reports such reporting information based on at least one user action performed on a downloaded web page, without causing such reporting information to be generated, the computer readable instructions, when executed, cause a computer system to:

download the web page from a download server, the downloaded web page including a plurality of elements;

for an original function associated with an element of the plurality of elements on the web page that provides the reporting information to the at least one server based on a first user action, replace the original function with a different function that, based on a second user action performed on the downloaded web page, reports to a computer system other than the at least one server to which the reporting information would be generated by the original function, information about the replaced original function, the information comprising an identifier of the at least one server, and the reporting information that would have been provided by the original function so as to disallow the original function from providing the reporting information to the at least one server;

alter, via a link replacer, a link associated with the element to disable an operability of the element;

simulate a performance of at least one user action with the element on the web page that would have caused the replaced original function to provide the reporting information to the at least one server;

collect the information about the replaced original function that is reported in response to the simulated user actions; and display the collected reporting information.

14. The nontransitory computer useable medium of claim 13, wherein-the user action comprises a hover above the element on the web page.

15. The nontransitory computer useable medium of claim 13, wherein the user action comprises a click on the element on the web page.

16. The nontransitory computer useable medium of claim 13, wherein the computer readable instructions, when executed, cause the computer system to filter at least one type of element on the web page before the simulating the performance step.

17. The nontransitory computer useable medium of claim 16 wherein the at least one type of element is received from an administrator.

18. The nontransitory computer useable medium of claim 13, wherein the computer readable instructions, when executed, cause the computer system to replace the link on the web page.

* * * * *